G. E. ROUSE.
BALING PRESS.
APPLICATION FILED SEPT. 25, 1909.
1,004,911.
Patented Oct. 3, 1911.
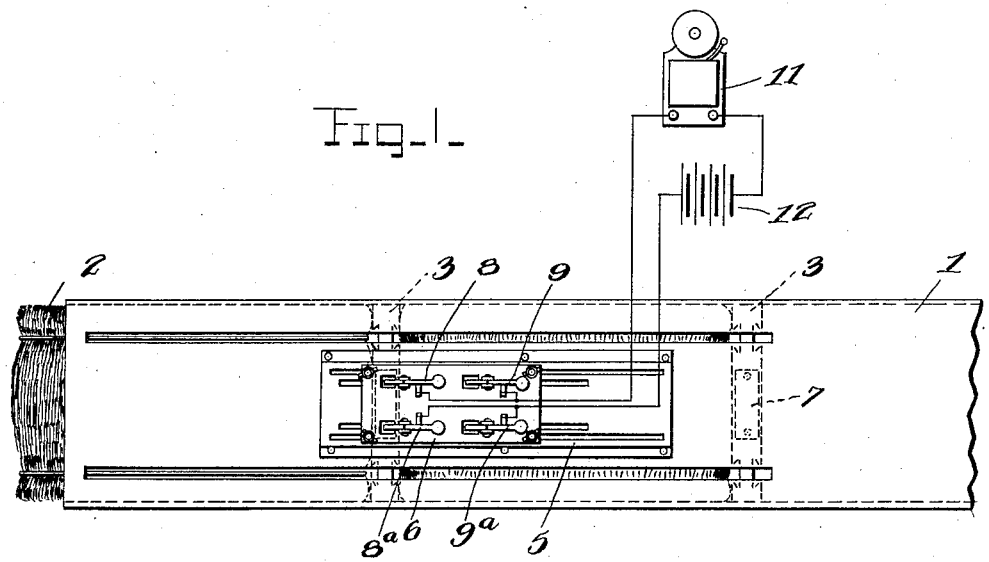
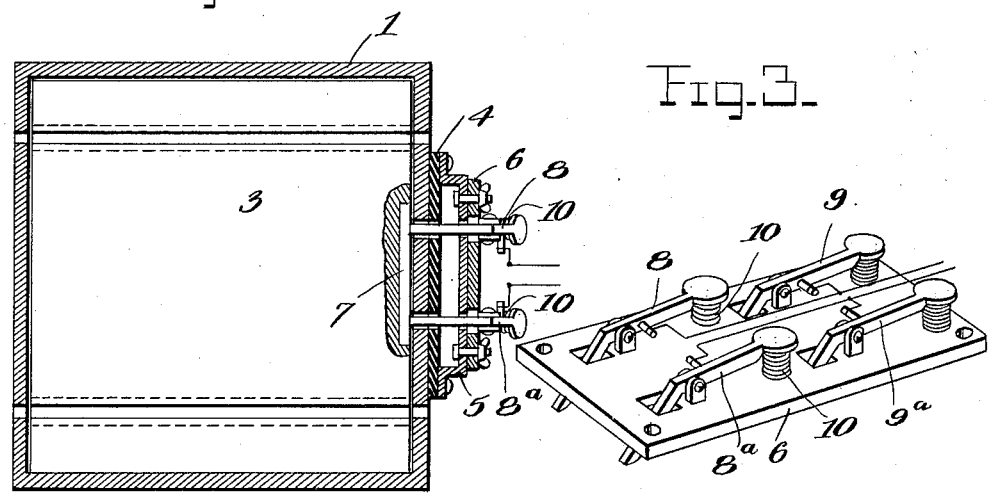
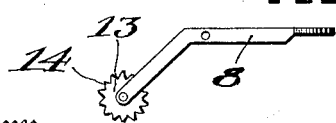
Witnesses
Inventor
George E. Rouse
By Langdon Moore
Attorney

UNITED STATES PATENT OFFICE.

GEORGE E. ROUSE, OF MARLEY, ILLINOIS.

BALING-PRESS.

1,004,911.  Specification of Letters Patent.  Patented Oct. 3, 1911.

Application filed September 25, 1909. Serial No. 519,549.

*To all whom it may concern:*

Be it known that I, GEORGE E. ROUSE, a citizen of the United States, residing at Marley, in the county of Will and State of Illinois, have invented new and useful Improvements in Baling-Presses, of which the following is a specification.

This invention relates to baling presses and more particularly to a signal to be attached to presses of this description.

In one well known type of power baling press, the press frame comprises practically a long chute closed at the sides a portion of the way to provide a chamber within which the material is compressed. The hay or material is fed into the press near one end and the bales are formed separately by the insertion of division blocks.

The object of my invention is to provide a signal adapted to be secured to the side of the chute and operated by a division block to indicate to the operator that sufficient material has been fed to form a bale and that it is time to insert another division block. The material is fed to the press continuously and unless some such signal is provided the size of the bales will not be uniform, for otherwise the operator has no means to determine the amount of material comprising the bales formed between the division blocks. The operating mechanism of the signal is adjustably secured to the outside chute and as the signal is operated by the division block in passing this mechanism, the operation of the signal may be delayed or advanced in accordance with the size of the bales desired. Furthermore the signal as contemplated in my invention will first indicate to the operator to be in readiness to insert the division block and then indicate the exact time for the insertion of the block.

The accompanying drawing illustrates the preferred form, yet it is to be understood that minor detail changes may be made without departing from the scope of the invention.

Figure 1 is a view in side elevation of a portion of a baling press to which my invention has been applied. Fig. 2 is a view in transverse section through the press and operating device of the signal. Fig. 3 is a perspective view of the operating mechanism of the signal, in detail. Fig. 4 is a detail view of a modified form of contact.

1 represents the chute of the press frame of the general type described above.

2 is a complete bale passing from the press.

3, 3 are division blocks used to separate the bales from each other.

4 is a plate of insulating material secured to the side of the chute at some point beyond the compression chamber.

5 is a raised base secured through plate 4 to the side of chute 1.

6 is a plate adjustably secured to base 5 and supports the operating mechanism of the signal.

The division blocks 3 are the usual construction with the addition of a metallic plate 7 secured centrally at the outer edge. The operating mechanism consists of four fingers arranged in pairs 8, $8^a$ and 9, $9^a$ pivotally supported upon the plate 6. Each finger is provided with an angular projection passing through apertures provided therefor in plate 6, base 5, insulation 4 and side of chute 1, and extends a sufficient distance within the chute to be engaged by the metallic plate 7 carried by the division block 3. The outer arm of each finger is provided with a coil spring 10 engaging the plate 6 and exerting an upward pressure upon the finger.

11 is an electric indicator or annunciator, in this instance illustrated as an electric bell of the usual type. 12 is an electric battery or other source of electrical energy in circuit with said indicator or annunciator. One finger of each pair of fingers, for instance fingers 8 and 9, are electrically connected to one pole of the battery 12, while the other fingers of each pair, for instance $8^a$ and $9^a$, are electrically connected to the opposite pole of the battery 12.

As a division block 3 passes through the chute 1, the plate 7 carried thereon will be engaged by the nearest pair of fingers 9 and $9^a$ thus completing the circuit through the indicator or annunciator 11 and will act as a warning to the operator that it is about time to insert another division block. Thus the plate 7 as the division block 3 progresses through the chute will next engage the finger 8 and $8^a$ completing the circuit through the same and operate the indicator or annunciator 11 a second time. This second operation will indicate to the operator that the proper amount of material has been fed into the press to form a bale of desired size, and it is time to insert the division block which was placed in readiness upon the first signal.

It may be that at times the goods under pressure in passing through the chute 1 will engage the fingers 8 and 9, especially if the bearings of the fingers become worn and allow the ends to project into the chute under the action of the spring 10 and cause them to clog or interfere with their proper operation. To overcome this and prevent such an occurrence a rotary spur wheel 13 is mounted upon the ends of fingers 8 and 9, as shown in Fig. 4. The spur wheels are provided with contact teeth or spurs 14, which will be engaged by the plate 7 to operate the annunciator, but should the goods in any way engage a tooth or spur in the wheel it will only rotate the wheel presenting another contact tooth or spur after the obstruction has passed and in no way interfere with the proper operation of the device.

As it is often desirable to form bales of different lengths according to the material used, the operating mechanism is adjustably arranged upon the side of the chute by forming the apertures in the base 5, insulation 4 and side of the chute 1 in the form of elongated slots, and the plate 6 is adjustably secured to the base 5 in order that its position may be changed as desired.

It is preferable to provide each end of the division blocks 3 with a contact plate 7, to insure the operation of the annunciator irrespective of the manner in which the blocks are inserted.

In a mechanical signal the operating mechanism and annunciator must necessarily be placed in rear relation or provided with a cumbersome connecting means which is more or less liable to get out of order or be damaged by the operation or transportation of the press. In an electrical signal such as contemplated by this invention the operating mechanism may be placed near the discharge end of the chute as is often desirable while the annunciator may be placed wherever desired irrespective of the operating mechanism and without danger to the connection.

What I claim is:—

1. In a baling press, the press frame in combination with the division blocks, a source of electricity, an annunciator, an operating mechanism in circuit therewith comprising a contact arm electrically connected with each pole of said source, a rotatable spur wheel carried on the interior end of each contact arm and a contact plate carried on each division block adapted to wipe over and close the circuit through the spur wheels and contact arms.

2. In a baling press, the press frame in combination with the division blocks, a source of electricity, an annunciator, an operating mechanism therefor comprising a plurality of contact arms electrically connected with each pole of said source and arranged in pairs, a rotatable spur wheel carried on the extremity of each contact arm and a contact plate carried on each division block adapted to wipe over and close the circuit through the spur wheels and contact arms successively to distinctly and successively operate the annunciator.

GEORGE E. ROUSE.

Witnesses:
CHAS. BEADLE,
A. E. WEBER.

Copies of this patent may be obtained for five cents each, by addressing the "Commissioner of Patents, Washington, D. C."